United States Patent [19]

Herlitzek

[11] 4,145,935

[45] Mar. 27, 1979

[54] MULTISPEED REVERSIBLE TRANSMISSION SHIFTABLE UNDER LOAD

[75] Inventor: Werner Herlitzek, Friedrichshafen, Fed. Rep. of Germany

[73] Assignee: Zahnradfabrik Friedrichshafen AG, Friedrichshafen, Fed. Rep. of Germany

[21] Appl. No.: 826,969

[22] Filed: Aug. 22, 1977

[51] Int. Cl.² ............................................. F16H 3/08
[52] U.S. Cl. ...................................... 74/331; 74/360; 74/325
[58] Field of Search ................. 74/331, 745, 360, 359, 74/325

[56] References Cited

U.S. PATENT DOCUMENTS

| B 358,244 | 1/1975 | Jameson | 74/331 |
| 3,710,637 | 1/1973 | Fisher et al. | 74/331 |
| 3,858,455 | 1/1975 | Sisson et al. | 74/331 |
| 3,893,345 | 7/1975 | Sisson et al. | 74/331 |
| 3,916,710 | 11/1975 | Sisson et al. | 74/331 |

FOREIGN PATENT DOCUMENTS

| 2418861 | 4/1974 | Fed. Rep. of Germany | 74/331 |
| 766214 | 1/1957 | United Kingdom | 74/331 |

Primary Examiner—Samuel Scott
Assistant Examiner—James Yates
Attorney, Agent, or Firm—Karl F. Ross

[57] ABSTRACT

A multispeed reversible transmission shiftable under load having fixed rotation axes for a plurality of gears and respective clutches. The basic structure of the transmission comprises an input gear which forms a gear train for second and third gears each of which is rotatable upon one of the aforementioned fixed axes and is connected by a respective direction clutch (forward or reverse clutch) with fourth and fifth gears also rotatable upon the respective fixed axes and meshing with one another. These fourth and fifth gears are connected by first and second speed-changing clutches with sixth and seventh gears, respectively, locatable about the first and second fixed axes, an eighth gear being connected to the seventh gear and rotatable about the second fixed axis. The ninth gear meshes with the eighth gear and is rotatable about the third fixed axis and is connectible via the third speed-changing clutch with the tenth gear which meshes with the fifth gear but is rotatable about the third fixed axis. An output (eleventh) gear is connected to the ninth gear and drives the output shaft.

8 Claims, 5 Drawing Figures

FIG. 2

|   | V | R |
|---|---|---|
| 1 | KV + K1 | KR + K1 |
| 2 | KV + K2 | KR + K2 |
| 3 | KV + K3 | KR + K3 |
| 4 | K4 + K3 | — |

FIG. 4

|   | V | R |
|---|---|---|
| 1 | KV + K1 | KR + K1 |
| 2 | KV + K2 | KR + K2 |
| 3 | KV + K3 | KR + K3 |

MULTISPEED REVERSIBLE TRANSMISSION SHIFTABLE UNDER LOAD

CROSS-REFERENCE TO RELATED APPLICATION

This application is related to Ser. No. 826,968, filed concurrently herewith.

FIELD OF THE INVENTION

The present invention relates to a multispaced direction-changing transmission for load-driving applications and, more particularly, to a transmission whose input element is adapted to be connected to a prime mover, such as an internal-combustion engine, and whose output element can be connected to a load. More specifically, the invention relates to a multispaced direction-changing transmission which can be shifted under load.

BACKGROUND OF THE INVENTION

A multispaced direction-changing transmission, shiftable under load, is described, for example, in U.S. Pat. No. 3,858,455, this transmission having a maximum of two clutches disposed, along a common axis, each formed as a so-called double clutch with a common lamella carrier and other parts. The number of parts of such a transmission, for a given number of speed changes, is relatively high and the cost of making the transmission, because of the requirement for a minimum number of parts for a given speed-change capability, is high.

OBJECT OF THE INVENTION

It is the object of the present invention to provide an improved multispeed direction-changing transmission, shiftable under load, which can be fabricated at lower cost and has, for a given number of parts, a greater speed-changing capability or, with the same speed-changing capability as the prior art transmission, a reduced number of parts and hence lower costs.

SUMMARY OF THE INVENTION

This object and others which will become apparent hereinafter are obtained, in accordance with the present invention, in a multispeed direction-changing clutch having three axes fixed to the housing and at least one of which is offset from the plane of the other two, and a basic construction involving eleven gears, three speed-changing clutches and a pair of directional clutches, namely, a forward clutch and a reverse clutch.

According to the invention, the basic structure of the transmission comprises an input or first gear which is connected to a pair of gears (second and third gears) to form a gear train therewith. The two gears of this train rotating in the same sense, usually the second and third gears, are connected via the forward and reverse directional clutches, respectively, with fourth and fifth gears which mesh with one another. The fourth and fifth gears are connected, in turn, by first and second speed-changing clutches with sixth and seventh gears.

The seventh gear is directly connected to the eighth gear which, in turn, meshes with the ninth gear rotatable about the third fixed axis and connected by the third direction-changing clutch to the tenth gear which meshes with the fifth gear. The ninth gear, moreover, meshes with a further (eleventh) gear driving the output shaft, this further gear constituting the output element of the transmission.

According to a feature of the invention, the second, fourth and sixth gears and the forward and first speed-changing clutches are disposed along a first axis fixed with respect to the housing while the third, fifth, seventh and eighth gears are disposed along a second axis fixed to the housing. The reverse and second speed-changing clutches are also disposed along the second axis. Furthermore, the ninth and tenth gears as well as the third direction-changing gear are disposed along the third axis.

As noted, the first, second and third axes are not coplanae according to the invention but are so disposed that the fourth and fifth gears and the sixth and seventh gears can mesh directly with one another while the second and third gears are coupled together, each via the first or input gear.

According to another feature of the invention, the third gear is connected via an idler having a fixed axis which is offset from the planes of the first, second and third axes and which drives a twelfth gear which can be connected by a fourth speed-changing clutch to the tenth gear, the twelfth gear and fourth speed-changing clutch can be disposed along the third axis mentioned previously.

According to still another feature of the invention, the input or first gear, which meshes with the second and third gears mentioned above, is driven by the turbine of a torque-converter whose impeller or pump is rotated by the crankshaft of an internal combustion engine, the stator of the torque-converter being affixed to the transmission housing.

The gear connected by the fourth speed-changing clutch to the tenth gear may also mesh directly with the third gear.

The transmission systems described above, according to the invention, are able to make used of reduced numbers of parts and smaller overall constructions than the prior-art system as mentioned in U.S. patent No. 3 858 455 with the same or greater speed-changing capability. The gear changing can be carried out simply and while the system is under load.

With the system of the present invention, moreover, it is not always necessary to maintain a direction clutch in operation for all of the speeds of the transmission and, for example, it is possible to provide a forward speed in which the direction clutch normally used for forward speed operation is not required.

BRIEF DESCRIPTION OF THE DRAWING

The above and other objects, features and advantages of the present invention will become more readily apparent from the following description, reference being made to the accompanying drawing in which:

FIG. 2 is a table showing the various speeds and directional capabilities of the transmission of FIG. 1;

FIG. 4 is a table showing the speeds of this transmission; and

SPECIFIC DESCRIPTION

Figure 1:
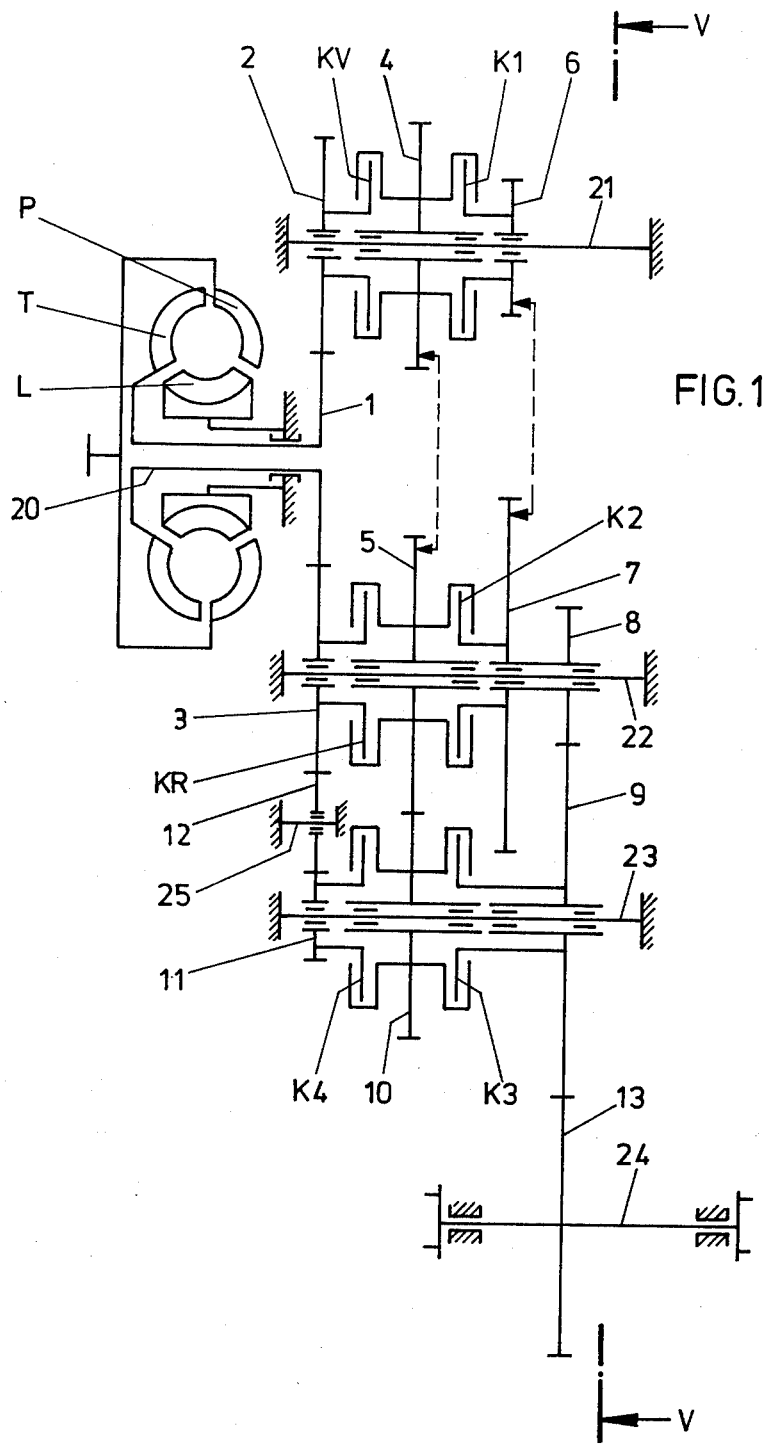
FIG. 1 is a diagram illustrating a multispeed transmission according to the invention.

Referring first to FIG. 1, it will be apparent that a multispeed direction-changing transmission of the present invention, shiftable under load, can comprise an input or first gear 1 which is connected to the shaft 20 of a torque-converter turbine T, the input element or impeller P of this torque-converter being connected, in turn, to the crankshaft of an internal-combustion engine. The torque-converter has a stator L which is fixed to the housing of the transmission as illustrated diagrammatically in FIG. 1.

The first gear 1 meshes with a pair of gears 2 and 3, respectively, the second and third gears of the transmission, the gears 2 and 3 forming with the gear 1 a gear train having two elements (2 and 3) rotatable in the same sense. These elements are connected to the directional clutches KV and KR, respectively.

The gears 2 and 3 are provided rotatably on a fixed shaft 21 and 22, respectively, defining axes fixed to the transmission housing. As can be seen from FIG. 5, the axes 21 and 22 define a plane which is inclined to the vertical and is practically horizontal. The shaft 20 of the torque-converter and gear 1 is offset above the plane of the axes 21 and 22.

The forward directional clutch KV is connected to a fourth gear 4 which is rotatable upon the shaft 21 relative to the gear 2 and this fourth gear 4 is connected, in turn, by the first speed-changing clutch K1, also centered on the first axis of shaft 21. This first speed-changing clutch K1 is connected to a sixth gear 6 which is rotatable upon the shaft 21 relative to the gears 2 and 4.

Correspondingly, the gear 3 is connected by a reverse direction clutch KR to a fifth gear 5 centered upon and rotatable about the shaft 22 independently of gear 3 when the clutch is disengaged and connectible, by a speed-changing clutch (second clutch) K2 with the seventh gear 7. Gear 7 is rotatable about the shaft 22 and is connected with the eighth gear 8.

Figure 5:
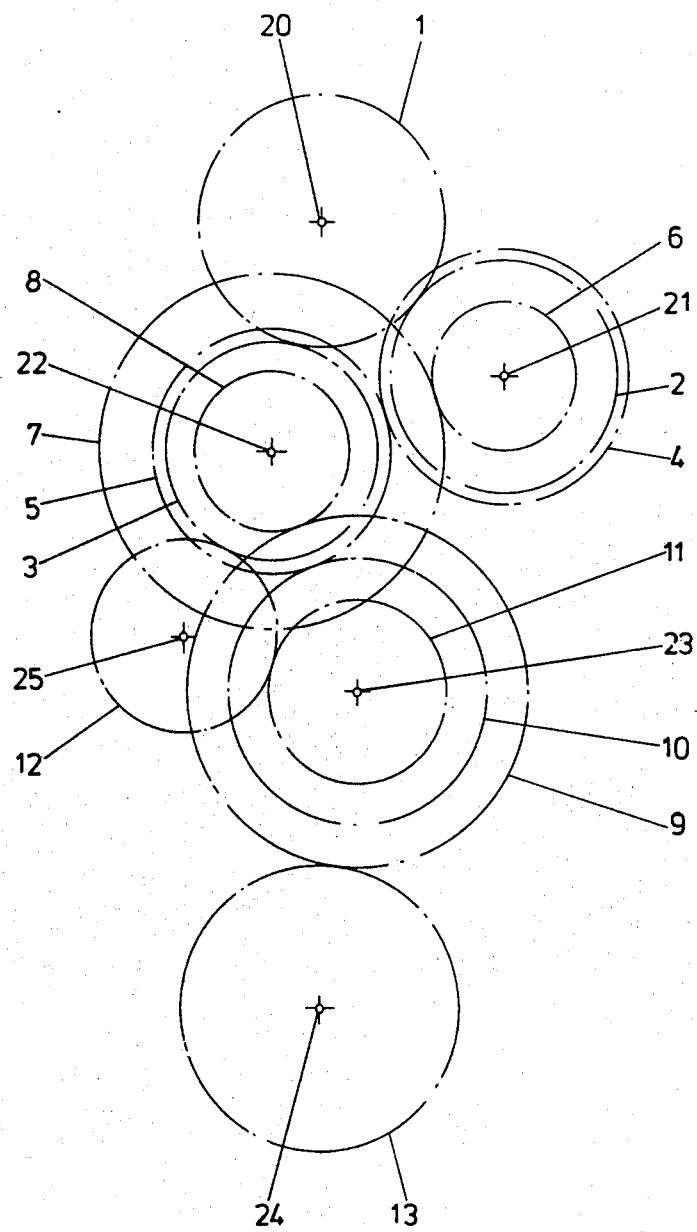
FIG. 5 is a view taken along the line V—V of FIG. 1, FIGS. 1, 3 and 5 all being diagrammatic or schematic in form.

As represented by broken lines in FIG. 1, but shown in greater detail in FIG. 5, the shafts 21 and 22 are so disposed and gears 4 and 5 mesh directly and gears 6 and 7 mesh directly.

The eighth gear 8 is connected to a ninth gear 9 which is rotatable about a third axis 23. This axis 23 is also fixed to the housing and, as can be seen from FIG. 5, is disposed below the plane of the axes 21 and 22. Furthermore, the plane of axes 22 and 23 is offset from the axis 21. while the plane of axes 21 and 23 is offset from the axis 22. The shaft 20 and the axis 23 define a substantially vertical plane with the axes 21 and 22 lying on opposite sides thereof.

The gear 9 is connectible via a third speed-changing clutch K3 with a gear 10 rotatable about the axis 23 independently of gear 9, when the clutch K3 is disconnected, the gear 10 meshing with the gear 5.

The gear 9 can be connected to a further gear 13, constituting the output element and, if desired, the eleventh gear, gear 13 being connected to a shaft 24, the latter constituting the output shaft and driving the load.

In addition, the gear 3 is in mesh directly or via a gear 12, with a gear 11 (twelfth gear) rotatable about the third axis and connectible by a fourth speed-changing clutch K4 with the gear 10. When an idler gear 12 is interposed between the gears 3 and 11, it can be rotatable about a fixed axis 25 which is offset from the planes mentioned previously.

The transmission illustrated in FIG. 1 can perform in any functions described here in the aforementioned patent and has four forward gears V and three reverse gears 5 as shown in the table of FIG. 2. Reference to KV plus K1 indicates that clutch KV and clutch K1 are actuated to give low forward speed. The other designations in the table can be read similarly. Thus, a third reverse speed is provided by actuation of clutch KR and clutch K3.

Figure 3:
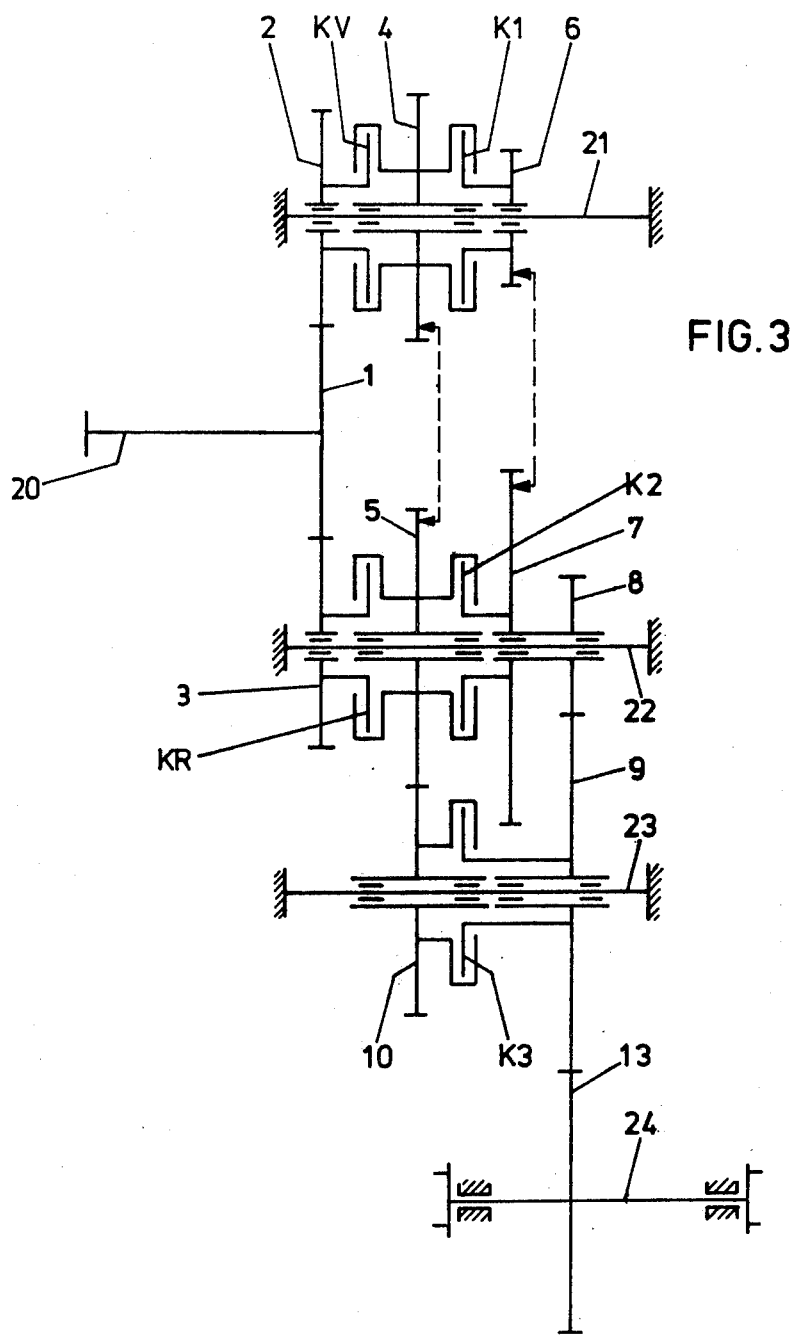
FIG. 3 is a view similar to FIG. 1 illustrating another transmission according to the invention.

The embodiment of FIG. 3 differs from that of FIG. 1 only in that clutch K4 and gears 11 and 12 are omitted. In this case, the operation is represented by the table in FIG. 4 which has a reduced number of forward gears. High speed forward drive in the FIG. 1 embodiment, of course, enables the forward drive to be obtained with clutch KV unactuated and undriven.

The details of the housing and clutch actuating structure will be apparent from the copending application identified above.

I claim:

1. A multispeed reversible transmission shiftable under load, comprising:
   a transmission housing defining a first, a second and a third fixed axes;
   a first gear on said housing connected to a driving source;
   second and third gears in said housing forming a gear train with said first gear, two of the gears of said train being driven in the same sense and rotating about said first and said second axis, respectively;
   a pair of direction clutches disposed along said first and said second axes, respectively, and connecting fourth and fifth gears respectively, with corresponding gears of said two gears of said train, said fourth and fifth gears meshing directly with one another;
   first and second speed-changing clutches disposed along said first and second axes and respectively connecting said fourth and fifth gears to sixth and seventh gears rotatable about said first and second axes, respectively, said sixth and seventh gears meshing directly with one another;
   an eighth gear rotatable about said second axis and connected with said seventh gear for angular displacement therewith;
   a ninth gear rotatable about said third axis and meshing with said eighth gear;
   a third speed-changing clutch connecting said ninth gear with a tenth gear rotatable about said third axis and meshing with said fifth gear; and
   a thirteenth gear meshing with said ninth gear and constituting a load-driving output element of said transmission.

2. The transmission defined in claim 1 wherein said direction clutches are respectively connected to said second and third gears, said second and third gears being rotatable, respectively, about said first and second axes.

3. The transmission defined in claim 2, further comprising an eleventh gear rotatable about said third axis, a fourth speed-changing clutch connecting said tenth gear with said eleventh gear, said eleventh gear being rotatably entrained by said third gear.

4. The transmission defined in claim 3, further comprising an idler gear meshing with said third and eleventh gears.

5. The transmission defined in claim 4 wherein said first and second axes define a plane and said first gear is rotatable about an axis on one side of said plane and said third axis is disposed on the opposite side of said plane.

6. The transmission defined in claim 5 wherein said idler gear is rotatable about an axis offset from the claimed defined by the first and second axes, the plane defined by said first and third axes, and the plane defined by said second and third axes.

7. The transmission defined in claim 2 wherein said first and second axes define a plane and said third axis is offset from said plane.

8. The transmission defined in claim 1, further comprising a torque-converter having a turbine connected to said first gear, and impeller connectible to a prime mover and a stator connected to the housing of the transmission.

* * * * *